(12) United States Patent
Gregoire et al.

(10) Patent No.: US 7,303,603 B2
(45) Date of Patent: Dec. 4, 2007

(54) DIESEL PARTICULATE FILTER SYSTEM WITH META-SURFACE CAVITY

(75) Inventors: Daniel J. Gregoire, Thousand Oaks, CA (US); Weldon S. Williamson, Malibu, CA (US); Kevin W. Kirby, Calabasas Hills, CA (US); Amanda Phelps, Malibu, CA (US); Daniel F. Sievenpiper, Santa Monica, CA (US)

(73) Assignee: General Motors Corporation, Detroit, MI (US)

( * ) Notice: Subject to any disclaimer, the term of this patent is extended or adjusted under 35 U.S.C. 154(b) by 333 days.

(21) Appl. No.: 10/987,314

(22) Filed: Nov. 12, 2004

(65) Prior Publication Data

US 2006/0101794 A1    May 18, 2006

(51) Int. Cl.
*B01D 46/00*    (2006.01)
*F01N 3/028*    (2006.01)
(52) U.S. Cl. .................. 55/282.3; 55/282.2; 55/283; 55/385.3; 55/523; 55/524; 55/DIG. 10; 95/273; 95/278; 60/303; 60/311
(58) Field of Classification Search ............. 55/282.2, 55/282.3, 283, 385.3, 523, 524, DIG. 10, 55/DIG. 30; 95/273, 278; 60/297, 303, 60/311
See application file for complete search history.

(56) References Cited

U.S. PATENT DOCUMENTS

| | | | |
|---|---|---|---|
| 3,622,732 A | 11/1971 | Williams | |
| 3,872,276 A | 3/1975 | Corcoran et al. | |
| 4,405,850 A | 9/1983 | Edgar | |
| 4,851,630 A | 7/1989 | Smith | |
| 4,934,141 A * | 6/1990 | Ollivon et al. ............ 60/303 |
| 4,963,709 A | 10/1990 | Kimre, Jr. | |
| 5,074,112 A * | 12/1991 | Walton et al. ............ 60/311 |
| 5,087,272 A * | 2/1992 | Nixdorf .................... 55/523 |
| 5,220,142 A | 6/1993 | LaMaire et al. | |
| 5,222,543 A | 6/1993 | Carlstrom et al. | |
| 5,369,250 A | 11/1994 | Meredith | |
| 6,379,407 B1 * | 4/2002 | Blackwell et al. ....... 55/282.3 |
| 6,540,816 B2 | 4/2003 | Allie et al. ............... 55/282.3 |

(Continued)

FOREIGN PATENT DOCUMENTS

DE    40 14 153 A1    12/1991    ................. 46/30

(Continued)

OTHER PUBLICATIONS

J.T. Bernhard et al., "Dielectric Slab-Loaded Resonant Cavity For Applications Requiring Enhanced Field Uniformity", IEEE Transactions on Microwave Theory and Techniques, vol. 44, No. 3, Mar. 1996, pp. 457-460.

(Continued)

*Primary Examiner*—Jason M. Greene

(57) ABSTRACT

A diesel particulate filter including a microwave-absorbing target housed within a waveguide cavity lined along the walls with a hard-electromagnetic surface (HES). The HES modifies specific electromagnetic boundary conditions for a given design frequency so as to enable the establishment of electromagnetic field patterns which are more uniform across the cavity thereby causing the target material to undergo enhanced uniformity heating. The heating of the microwave absorbing media causes particulate buildup to be vaporized and removed from the filter by the exhaust stream flow.

18 Claims, 3 Drawing Sheets

U.S. PATENT DOCUMENTS

| | | |
|---|---|---|
| 6,603,357 B1 | 8/2003 | Higgins et al. |
| 6,709,489 B2 | 3/2004 | Ament et al. ............... 55/282.3 |
| 6,946,013 B2 * | 9/2005 | Alward et al. ............. 55/282.3 |
| 7,091,457 B2 | 8/2006 | Gregoire et al. |
| 2002/0069756 A1 | 6/2002 | Mako et al. .................. 95/148 |
| 2003/0061791 A1 * | 4/2003 | Barbier et al. ............. 55/282.3 |

FOREIGN PATENT DOCUMENTS

| | | | |
|---|---|---|---|
| EP | 1 541 819 A1 | 6/2005 | .................... 46/42 |

OTHER PUBLICATIONS

Magdy Z. Mohamed, et al., "A Multipol Analysis of a Dielectric Loaded Coaxial Rectangular Waveguide", IEE Transactions on Microwave Theory and Techniques, vol. 40, No. 3, Mar. 1992, pp. 482-494.

Mekki Belaid, et al., "Spacial Power Amplifier Using Passive and Active TEM Waveguide Concept", IEEE Transactions on Microwave Theory and Techniques, vol. 51, No. 3, Mar. 2003, pp. 684-689.

R. G. Heeren et al., "An Inhomogeneously Filled Rectangular Waveguide Capable of Supporting TEM Propagation", IEEE Transactions on Microwave Theory and Techniques, Nov. 1971, pp. 884-885.

J. Aiden Higgins, et al., Ka-Band Waveguide Phase Shifter Using Tunable Electromagnetic Crystal Sidewalls, IEEE Transactions on Microwave Theory and Techniques, vol. 51, No. 4, Apr. 2003, pp. 1281-1288.

Da Johnston, "Use of the TEM Mode in Microwave Heating Applications", IEEE Transactions on Microwave Theory and Techniques, Aug. 1972.

Fei-Ran Yang et al., "A Novel TEM Waveguide Using Uniplanar Compact Photonic-Bandgap (UC-PBG) Structure", IEEE Transactions on Microwave Theory and Techniques, vol. 47, No. 11, Nov. 1999, pp. 2092-2098.

International Search Report mailed Feb. 2, 2007.

* cited by examiner

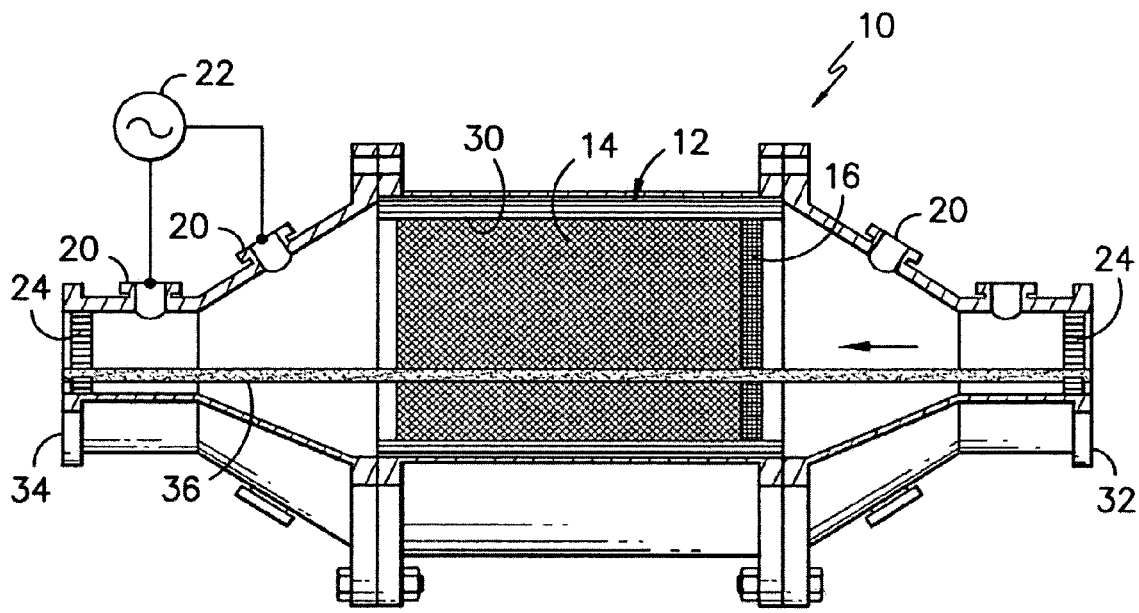
*FIG. -1-*
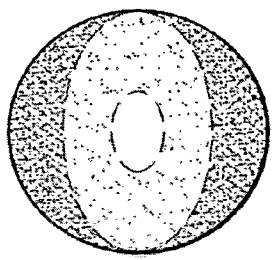
*FIG. -2A-*
PRIOR ART
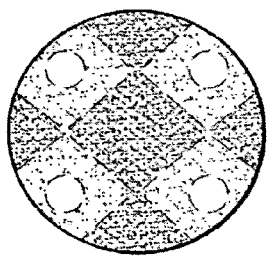
*FIG. -2B-*
PRIOR ART
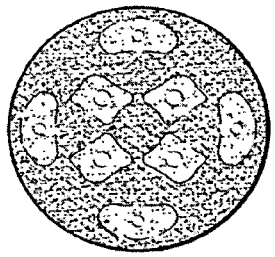
*FIG. -2C-*
PRIOR ART
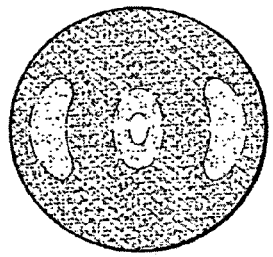
*FIG. -2D-*
PRIOR ART

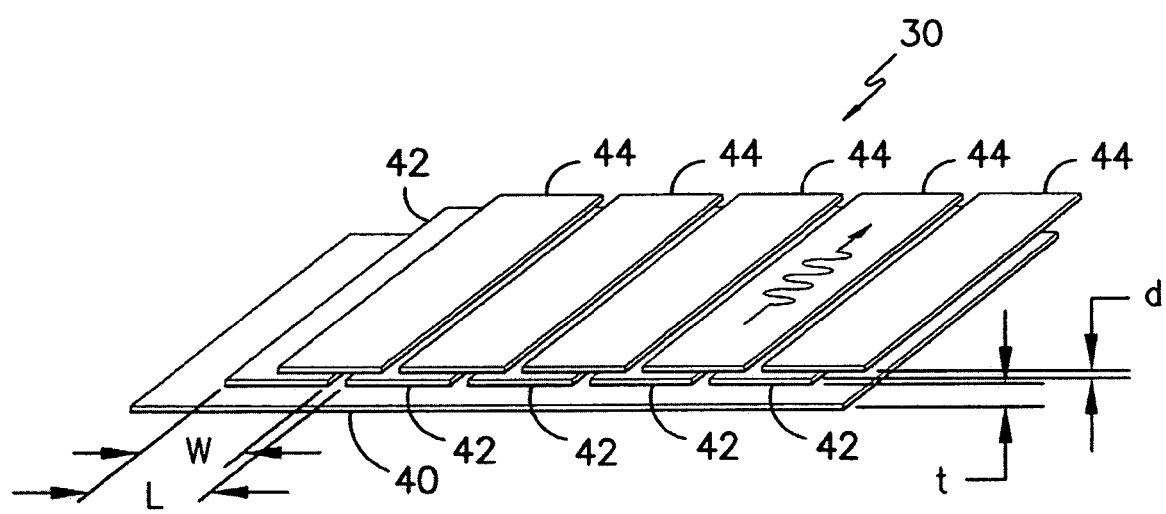
FIG. -3-

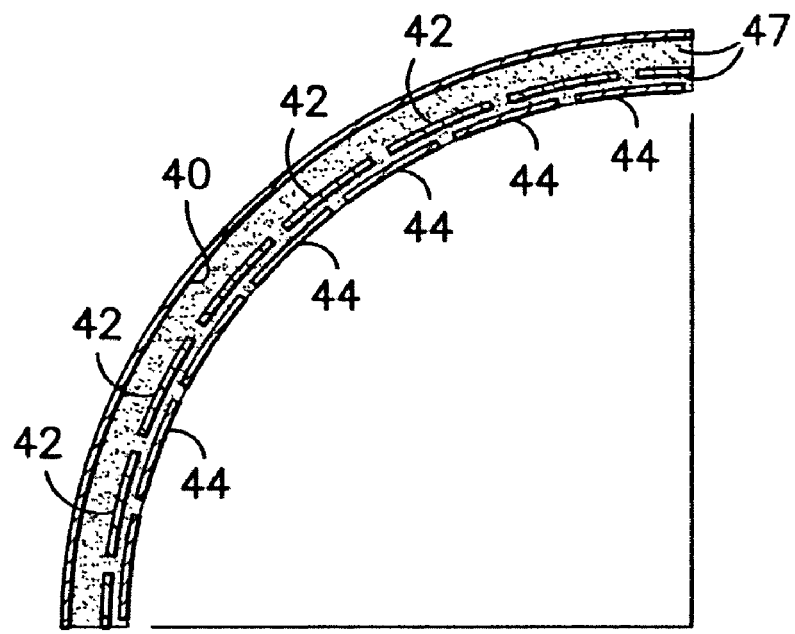
FIG. -4-
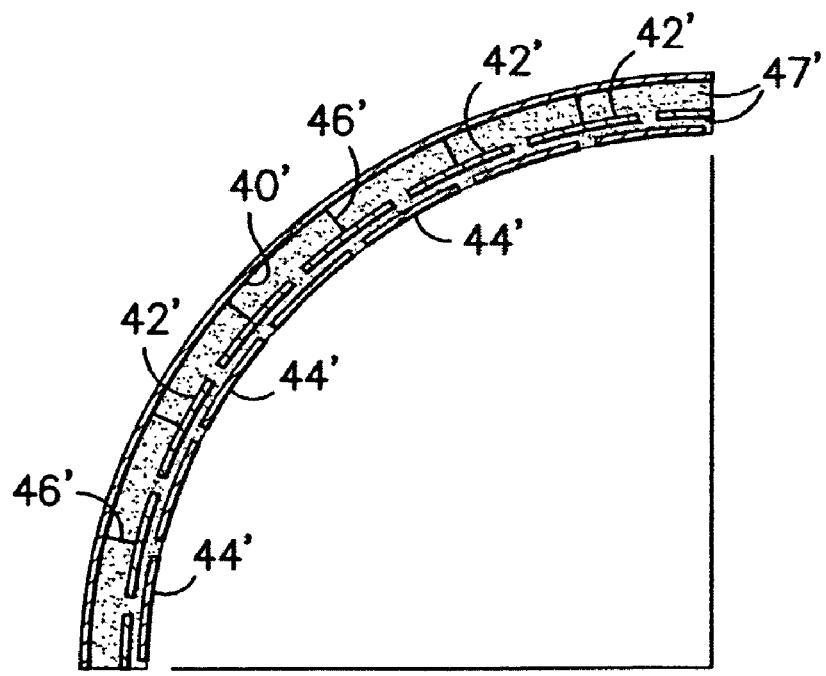
FIG. -4A-

US 7,303,603 B2

DIESEL PARTICULATE FILTER SYSTEM WITH META-SURFACE CAVITY

TECHNICAL FIELD

The present invention relates generally to diesel particulate filter systems, and more particularly to a diesel particulate filter system utilizing a ceramic filter to trap particulate exhaust in combination with a localized microwave absorbing media positioned in close proximity to regions of particulate buildup within the ceramic filter. The cavity housing the ceramic filter and microwave absorbing media is adapted to accept inputs of microwave-frequency electromagnetic radiation to establish field patterns causing the target absorbing media to undergo substantially uniform heating.

BACKGROUND OF THE INVENTION

The use of ceramic filters to entrap particulates carried by a diesel engine exhaust flow is known. In operation, such ceramic diesel particulate filters accept exhaust flow at one end and trap particulates as exhaust gases diffuse through thin channel walls and exit out the other end. Particulate buildup which is allowed to continue causes the filter to become clogged thereby giving rise to an undesirable increased pressure differential across the filter and leading to back pressure that reduces the engine efficiency. Thus, it is necessary to clear the particulate buildup before critical levels of obstruction are achieved. Such particulate removal may be effected by raising the temperature at the location of particulate buildup to a level above the flash point of the hydrocarbon particulates thereby causing combustion and vaporization of the particulates. Once the particulates are vaporized, the combustion products may be swept out of the filter by the exhaust stream.

In order for localized heating to efficiently remove particulates from the filter, such heating must be applied across substantially the entire cross-section of the filter. In the event that zones across the filter cross-section are left unheated, the particulates at those zones will not be vaporized and the filter will develop a pattern of plugged zones. Thus, it is desired to provide an efficient method of localized particulate combustion across substantially the entire exit plane of the filter so as to provide uniform heating across that plane.

The use of microwave-frequency electromagnetic radiation is known to be effective for heating dielectric materials in other environments. However, a challenge in using microwave-frequency radiation is the achievement of uniform temperature distributions across a target material. That is, the use of microwave-frequency radiation is highly susceptible to the creation of target hot sports and cold spots. As explained above, such non-uniformity is generally inconsistent with the requirements for particulate filter regeneration. Moreover, the environment of a particulate filter in a diesel exhaust system provides challenges with regard to space availability and cost constraints. Suitable systems for diesel exhaust filter regeneration based on microwave heating are not believed to have been previously available.

SUMMARY OF THE INVENTION

The present invention provides advantages and alternatives over the known art by providing a diesel particulate filter including a microwave-absorbing target disposed within a waveguide cavity lined along the walls with a hard-electromagnetic surface (HES). The HES modifies specific electromagnetic boundary conditions for a given design frequency so as to enable the establishment of electromagnetic field pattern which are more uniform across the cavity and do not vanish at the boundary walls as they would in an ordinary cavity. Instead, the electromagnetic field patterns are characterized by enhanced uniformity substantially across the cavity cross-section thereby causing the target material to undergo enhanced uniformity heating. The heating of the microwave absorbing media causes the particulate buildup to be vaporized and removed from the filter by the exhaust stream flow. An optional coaxial conductor element may be disposed along the center axis of the cavity so as to further enhance uniformity of the field patterns.

BRIEF DESCRIPTION OF THE DRAWINGS

The following drawings which are incorporated in and which constitute a part of this specification illustrate an exemplary embodiment of the present invention and, together with the general description above and the detailed description set forth below, serve to explain the principles of the invention wherein:

FIG. 1 is a cut-away view of a diesel particulate filter system incorporating a microwave-absorbing target positioned at the outlet of a ceramic filter within a cavity lined with a hard electromagnetic surface;

FIGS. 2A-2D illustrate known target heating patterns for different modes achieved in a right circular cavity with conductive walls of traditional construction;

FIG. 3 illustrates a potentially preferred construction of a hard electromagnetic surface for the walls of the cavity in FIG. 1;

FIG. 4 illustrates schematically a quarter-section of the waveguide cavity in FIG. 1 illustrating the arrangement of layers forming a hard electromagnetic surface construction; and FIG. 4A illustrates an alternative construction including grounding elements extending between the outer layer and an interior layer of the hard electromagnetic surface.

While embodiments of the invention have been illustrated and generally described above and will hereinafter be described in connection with certain potentially preferred embodiments and procedures, it is to be understood and appreciated that in no event is the invention to be limited to such embodiments and procedures as may be illustrated and described herein. On the contrary, it is intended that the present invention shall extend to all alternatives and modifications as may embrace the broad principles of this invention within the true spirit and scope thereof.

DESCRIPTION OF THE PREFERRED EMBODIMENT

Reference will now be made to the various drawings wherein to the extent possible like elements are designated by corresponding reference numerals in the various views. In FIG. 1, there is illustrated a diesel particular filter assembly 10 for disposition along the exhaust gas flow path down stream from a diesel engine (not shown). The direction of gas flow is illustrated by the directional arrow within the figure. According to the illustrated construction, the diesel particulate filter includes a cavity portion 12 that serves to contain a porous ceramic filter 14 and microwave-absorbing material 16 disposed in embedded contacting relation substantially across the cross-section of the filter 14. The microwave-absorbing material 16 may be any one or a combination of well known substances which undergo heating upon exposure to microwave radiation. By way of example, such materials may include SiC (Silicon Carbide), ITO (Indium-Tin Oxide), various ferrites, and the like as will be well know to those of skill in the art.

As illustrated, the diesel particulate filter assembly 10 is provided with one or more microwave coupling ports 20 at one or both ends for operative connection to a microwave power source 22 of greater than 1 kW such as a standard 2.45 GHz/2 kW source as will be well known and readily available. Preferably, a single microwave power source will be utilized although multiple sources can be utilized if desired. Microwave reflectors 24 which permit gas flow but which prevent excess of trapped microwave energy are provided at the inlet and outlet ends of the diesel particulate filter assembly 10.

As will be described further hereinafter, the cavity portion 12 is lined with a so-called hard-electromagnetic surface or metasurface structure which will hereinafter be referred to as an HES lining 30 so as to permit the cavity portion 12 to function as a waveguide in which electromagnetic field patterns are not caused to vanish at the cavity walls but rather extend in substantially uniform fields across the cavity cross-section. The cavity 12 and filter 14 with embedded microwave-absorbing material 16 are all preferably of a substantially cylindrical configuration having a substantially round cross-section. However, other cross-sectional geometries such as square, rectangular or elliptical and the like may also be utilized if desired.

In operation, diesel exhaust enters through an inlet aperture 32, passes into the filter 14 through intake channels, diffuses through the filter channel walls, flows out of the filter output channels and exits the cavity through the exhaust output aperture 34. In the flow process, particulates carried by the exhaust flow are deposited where the gases diffuse through the channel walls upon exiting the filter. As the engine continues to run, the particulate mass builds up until the exhaust gas flow is impeded. At a selected optimum point based on measured back pressure within the system, the microwave power source 22 is activated and energy enters the chamber thereby heating the microwave-absorbing material 16. The microwave-absorbing material 16 is disposed within the area of particulate buildup and as it absorbs energy, it heats to a point beyond the flash point of the accumulated hydrocarbon particulates. The particulates are thus ignited and are removed in vaporized form by the flow of exhaust gas.

To facilitate the uniform heating of the target microwave-absorbing material 16, the HES lining 30 is utilized within the cavity portion 12 so as to make applied field energy substantially uniform across the entire cross-section where particulates are deposited. In the illustrated embodiment, field uniformity is further promoted by the inclusion by the use of a coaxial conductor 36 which promotes the development of transverse electromagnetic (TEM) waves within the cavity portion. The use of the HES lining 30 in the cavity portion 12 either with or without an additional coaxial conductor has been found to provide greatly enhanced heating uniformity across the cross-section of the filter 14 as compared to heating profiles documented in targets within right circular cavities with standard conductive wall boundaries.

In standard microwave heating applications, non-uniform heating of the target material arises due to electromagnetic modes that constrain the heating energy to specific patterns within the heating cavity. For example, it is well documented that when microwave radiation is introduced into a cavity of cylindrical geometry housing a target element, the electromagnetic radiation within the cavity is distributed among several orthonormal cavity modes. Each of these modes is a solution to the Maxwell's wave equation for the cavity's particular boundary conditions. When the walls of the cavity are made of metal, the high conductivity dictates that the tangential electric field approaches zero at the cavity walls. The result is that there are spots within the cavity near the walls where the field is very small. At those locations, a target material experiences little or no heating.

To illustrate the traditional non-uniform heating, FIGS. 2A-2D illustrate heating profiles for circular targets at four different modes in a right circular cavity with conductive walls. In these figures, the lighter regions correspond to higher temperatures while the darker regions correspond to lower temperatures. In particular, FIG. 2A illustrates the heating pattern for the TE11 mode, FIG. 2B illustrates the heating pattern for the TE21 mode, FIG. 2C illustrates the heating pattern for the TE22 mode and FIG. 2D illustrates the heating pattern for the TE12 mode. Thus, as can be seen, there is a substantial non-uniformity of heating across the cavity cross-section.

The use of the HES lining 30 of appropriate construction at the walls within the cavity portion 12 has been found to substantially enhance field uniformity across the cavity and thereby enhance uniformity of heating a target within that cavity. The present invention incorporates a unique HES lining 30 of triple-layer construction to form an electromagnetic band gap (EBG) lining. The construction utilized permits the HES lining to be extremely thin and unobtrusive within the heating cavity. As illustrated in FIG. 3, the HES lining 30 incorporates a ground plane 40 in the form of the standard conductive cavity wall, a first layer of conducting strips 42 running in the length direction of the cavity offset from the ground plane 40 and laterally spaced apart from one another with a second layer of conducting strips 44 disposed in laterally spaced relation to one another such that the strips 44 in the second layer cover the spaces between the strips 42 in the first layer. A quarter section end view illustrating is arrangement in the cavity is illustrated in FIG. 4.

Layers of dielectric materials 47 are preferably disposed between the layers. The dielectric material acts as a spacer between the layers while also increasing the field breakdown voltage between layers since it is harder for a spark to go through a dielectric than through air. By way of example only, and not limitation, one contemplated dielectric material with desired high breakdown voltage character is believed to be available from DuPont under the trade designation KAPTON. It is contemplated that the placement of dielectric materials of different permittivity between the layers of conducting strips and/or the ground plane may be desirable to prevent electrical breakdown between adjacent conductive strips.

As illustrated in FIG. 3, wave propagation is allowed along the direction of the strips, when the wave frequency is near the HES's resonant frequency. Thus, by designing the HES lining 30 to yield a resonant frequency which closely approximates the frequency of the heating source used, much more uniform cross-sectional heating field can be achieved. In this regard, substantially complete uniform heating is achieved when the resonant frequency matches the heating radiation frequency. As microwave frequency is moved away from the resonance frequency, the heating patterns become more non-uniform.

The resonant frequency of the HES is determined by the HES's characteristic inductance (L) and capacitance (C) by the following formula.

$$f_r = 1/(2\pi\sqrt{LC})$$

The HES capacitance and inductance in turn are determined from the surface's geometrical dimensions. $L=\mu_o t$ is the approximate sheet inductance, and the sheet capacitance is the sum of the contributions from the parallel plates between layers, the edges from strip to strip within the layers, and the fringe capacitance from the edges strips of one layer to the body of the strips on the other layer.

The parallel-plate capacitance is $$C_{parallel} \approx \frac{E}{d}\left(w - \frac{1}{2}L\right)^2,$$

while the edge-to-edge capacitance is $$C_{edge} \approx \frac{w}{\pi} <E> \cosh^{-1}\frac{(L+w)}{(L-w)},$$

and the fringe capacitance is $$C_{fringe} \approx \frac{2w}{\pi} <E> \cosh^{-1}\frac{(w)}{(d)}$$

The bandwidth of the resonance is $$\frac{\Delta\omega}{\omega_r} = \frac{2\pi t}{\lambda_r}$$

By way of example, for an HES lining 30 utilizing the geometry of FIG. 3, with d=0.100 inches, w=0.380 inches, L=0.440 inches and t=0.250 inches, e=1.23, the resonant frequency is approximated by the above formulation to be 2.38 GHz with a bandwidth of 32%. A simulation of the HES lining using HFSS yields a resonant frequency of 2.5 GHz with a bandwidth of 33%. Thus, such an HES lining has a resonant frequency such that heating using a standard commercially available 2.45 GHz microwave source will be substantially uniform. Of course, the HES lining 30 may be the subject of substantial variation by adjustment of the various identified parameters.

In order to provide yet a further degree of uniformity it is also contemplated that the HES lining may include conductive grounding elements between the ground plane forming the wall of the cavity and the conductive strips. Such a construction is illustrated in FIG. 4A wherein elements corresponding to those previously described are designated by like reference numerals with a prime. As shown, the construction is identical to that illustrated in FIG. 4, with the exception that grounding elements 46' such as conductive studs or the like may extend between the first layer of conductive strips 42' and the ground plane 40' of the cavity wall. Such a construction may give rise to slightly improved uniformity relative to the non-grounded construction but may be slightly more complex to produce.

It is to be understood that while the present invention has been illustrated and described in relation to potentially preferred embodiments, constructions, and procedures, that such embodiments, constructions, and procedures are illustrative only and that the invention is in no event to be limited thereto. Rather, it is contemplated that modifications and variations embodying the principles of the invention will no doubt occur to those of ordinary skill in the art. It is therefore contemplated and intended that the present invention shall extend to all such modifications and variations as may incorporate the broad aspects of the invention within the true spirit and scope thereof.

The invention claimed is:

1. A diesel particulate filter system for removal of particulates from a diesel engine exhaust stream, the diesel particulate system comprising:
a filter housed within a containment cavity such that gases of the engine exhaust stream pass through the filter and at least a portion of the particulates within the engine exhaust stream are entrapped within the filter;
a target of microwave-absorbing material embedded within the filter; and
a microwave power source operatively connected to at least one microwave input port for introduction of microwave radiation into the containment cavity, wherein the containment cavity includes a multi-layer interior wall structure comprising a conductive base surface, a first layer of conductive strips spaced apart from one another in opposing spaced relation to the base surface and a second layer of conductive strips spaced apart from one another in opposing spaced relation to the first layer of conductive strips such that the first layer of conductive strips is disposed between the base surface and the second layer of conductive strips, wherein the conductive strips in the first and second layers extend in the longitudinal direction of the cavity and wherein the conductive strips in the second layer are disposed in offset relation to the conductive strips in the first layer so as to cover spaces between the conductive strips in the first layer such that upon activation of the microwave power source a heating field is developed across the cross-section of the cavity such that the target of microwave-absorbing material is heated in a substantially uniform pattern and at least a portion of the particulates entrapped within the filter in adjacent relation to the microwave-absorbing material are vaporized thereby reducing accumulation of the particulates within the filter.

2. The invention as recited in claim 1, wherein the filter is a ceramic filter.

3. The invention as recited in claim 2, wherein the micro-wave absorbing material is selected from the group consisting of SiC (Silicon Carbide), ITO (Indium-Tin Oxide), ferrites and combinations thereof.

4. The invention as recited in claim 1, wherein the containment cavity has a substantially cylindrical internal cross section and the filter is cylindrical with a substantially circular cross-section.

5. The invention as recited in claim 1, wherein the microwave power source is a 2.45 GHz microwave source.

6. The invention as recited in claim 5, wherein the microwave power source is a 2.45 GHz/2 kW microwave source.

7. The invention as recited in claim 1, wherein a dielectric material is disposed between the layers of conducting strips and the base surface.

8. The invention as recited in claim 1, wherein grounding elements are disposed between the base surface and at least a portion of conducting the strips in the first layer.

9. The invention as recited in claim 1, further comprising a coaxial conductor extending through the cavity in the length direction of the cavity.

10. A diesel particulate filter system for removal of particulates from a diesel engine exhaust stream, the diesel particulate system comprising:

a ceramic filter housed within a circular cross-section containment cavity such that gases of the engine exhaust stream pass through the filter and at least a portion of the particulates within the engine exhaust stream are entrapped within the filter;

a target of microwave-absorbing material embedded within the filter; and a 2.45 GHz microwave power source operatively connected to at least one microwave input port for introduction of microwave radiation into the containment cavity, wherein the containment cavity includes a multi-layer interior wall structure comprising a conductive base surface, a first layer of conductive strips spaced apart from one another in opposing spaced relation to the base surface and a second layer of conductive strips spaced apart from one another in opposing spaced relation to the first layer of conductive strips such that the first layer of conductive strips is disposed between the base surface and the second layer of conductive strips, wherein the conductive strips in the first and second layers extend in the longitudinal direction of the cavity and wherein the conductive strips in the second layer are disposed in offset relation to the conductive strips in the first layer so as to cover spaces between the conductive strips in the first layer such that upon activation of the microwave power source a heating field is developed across the cross-section of the cavity such that the target of microwave-absorbing material is heated in a substantially uniform pattern and at least a portion of the particulates entrapped within the filter in adjacent relation to the microwave-absorbing material are vaporized thereby reducing accumulation of the particulates within the filter.

11. The invention as recited in claim 10, wherein the micro-wave absorbing material is selected from the group consisting of SiC (Silicon Carbide), ITO (Indium-Tin Oxide), ferrites and combinations thereof.

12. The invention as recited in claim 10, wherein the microwave power source is a 2.45 GHz/2kW microwave source.

13. The invention as recited in claim 10 wherein a dielectric material is disposed between the layers of conducting strips and the base surface.

14. The invention as recited in claim 10, wherein grounding elements are disposed between the base surface and at least a portion of conducting the strips in the first layer.

15. The invention as recited in claim 1, further comprising a coaxial conductor extending through the cavity in the length direction of the cavity.

16. A diesel particulate filter system for removal of particulates from a diesel engine exhaust stream, the diesel particulate system comprising:

a ceramic filter housed within a circular cross-section containment cavity such that gases of the engine exhaust stream pass through the filter and at least a portion of the particulates within the engine exhaust stream are entrapped within the filter;

a target of microwave-absorbing material embedded within the filter; and a microwave power source operatively connected to at least one microwave input port for introduction of microwave radiation into the containment cavity, wherein the containment cavity includes a multi-layer interior wall structure comprising a conductive base surface, a first layer of conductive strips spaced apart from one another in opposing spaced relation to the base surface and a second layer of conductive strips spaced apart from one another in opposing spaced relation to the first layer of conductive strips such that the first layer of conductive strips is disposed between the base surface and the second layer of conductive strips, wherein the conductive strips in the first and second layers extend in the longitudinal direction of the cavity and wherein the conductive strips in the second layer are disposed in offset relation to the conductive strips in the first layer so as to cover spaces between the conductive strips in the first layer such that upon activation of the microwave power source a heating field is developed across the cross-section of the cavity such that the target of microwave-absorbing material is heated in a substantially uniform pattern and at least a portion of the particulates entrapped within the filter in adjacent relation to the microwave-absorbing material are vaporized thereby reducing accumulation of the particulates within the filter and wherein a dielectric material is disposed between the layers of conducting strips and the base surface.

17. The invention as recited in claim 16, wherein grounding elements are disposed between the base surface and at least a portion of conducting the strips in the first layer.

18. The invention as recited in claim 16, further comprising a coaxial conductor extending through the cavity in the length direction of the cavity.

* * * * *